United States Patent [19]
De Ridder et al.

[11] 3,819,425
[45] June 25, 1974

[54] COMPOSITE COATING ADHERENT UNDER SHEAR CONDITION

[75] Inventors: Jon A. De Ridder, Ashtabula; Alexander W. Kennedy, Chardon, both of Ohio

[73] Assignee: Diamond Shamrock Corporation, Cleveland, Ohio

[22] Filed: Oct. 18, 1972

[21] Appl. No.: 298,795

[52] U.S. Cl............................ 148/6.16, 148/6.15 R
[51] Int. Cl............................ C23c 1/10, C23f 7/00
[58] Field of Search...................... 148/6.16, 6.15 R

[56] References Cited
UNITED STATES PATENTS
3,717,509    2/1973    Palm et al............................ 148/6.2

*Primary Examiner*—John D. Welsh
*Attorney, Agent, or Firm*—John J. Freer

[57] ABSTRACT

Composite coatings, applied on metal substrates, maintain excellent adhesion when subjected to shearing forces such as encountered in metal stamping. This adhesion is obtained through first observing careful control over size distribution of particles associated with both the undercoating and the top-coating. Next control is exercised over comparative particle size selection for the undercoating versus the topcoating. Further, maintenance of other composite coating characteristics, e.g., corrosion resistance and impact adhesion, is stressed.

22 Claims, No Drawings

COMPOSITE COATING ADHERENT UNDER SHEAR CONDITION

BACKGROUND OF THE INVENTION

Coating compositions for metal substrates that are applied prior to painting are typically used to impart corrosion resistance to metal surfaces as well as enhance adhesion of subsequently applied paints. One or both of these characteristics can be augmented by including in the pre-paint coated composition a particulate substance such as finely divided metal. For example, in U.S. Pat. No. 3,671,331 there are disclosed pulverulent metal containing chromium bonding compositions that contain, in addition to the metal, a hexavalent-chromium-providing compound and reducing agent therefor in liquid medium.

Such compositions exhibit excellent adherence to metal substrates and offer many desirable characteristics, including the formation of a firm bond between subsequently applied paints and the underlying metal substrate. In U.S. Pat. No. 3,067,045 there is disclosed a coating composition providing a phosphate film. More particularly, the composition contains finely divided zinc metal in an alkaline aqueous solution of an alkali metal phosphate. These compositions produce continuous, firmly adherent films on the substrate metals. In U.S. Pat. No. 3,462,319, although the teaching goes on to discuss application of an organic film-forming resin, there is first suggested the earlier application of a chromic acid/phosphoric acid coating to a metal surface, such coating also containing up to 40 percent of an inorganic filler material, e.g., colloidal silica or zinc or aluminum metal powder. Further, a coating and bonding composition containing inorganic solid particulate material in an aqueous solution containing a combination of inorganic compounds, e.g., phosphoric and chromic acids, has been taught in U.S. Pat. No. 3,395,027.

Additional solid particulates can be achieved in pre-paint coating formation from a particulate-free coating composition, e.g., such compositions that contain phosphoric and/or chromic acids. The particulate formation may be enhanced after coating application by elevated temperature curing and thereby provide an ostensibly autogenous particulate formation. For example, U.S. Pat. No. 3,382,081 discloses the formation of an insoluble, polymeric microcrystalline substrate, i.e., particulate formation on a base metal, from chromic acid containing compositions that are subjected after application to elevated temperature heating.

Ostensibly all of these solid particulate substances find utility in coatings applied to metal substrates. Since they may stem from, or be included in, compositions which are applied to a metal substrate prior to application of a paint topcoating, considerations go beyond the characteristics which the particulate substance imparts to the pre-paint coating. Such other considerations include the characteristics afforded by the substance when the total coated article, including the pre-paint coating and subsequent topcoatings, is obtained. By way of example of composite coating systems, U.S. Pat. No. 3,671,331 discloses the topcoating of a weldable primer containing particulate material, e.g., particulate metal, over a hexavalent-chromium-providing bonding coating, which pre-paint bonding coating contains pulverulent metal. Also, U.S. Pat. No. 3,687,739 shows the application of a topcoating containing particulate material over a treated metal surface where such treatment includes application of a composition containing, as critical ingredients, chromic acid and a particulate metal.

After pre-paint coating and topcoat application, the resulting coated article most usually proceeds through further working. In addition to such further operation as subsequent topcoating, the coated metal can typically be subjected to a metal forming operation. For example, in the automotive industry, a coated metal workpiece may proceed through as many as five or more operations initiated by drawing, or pressing, and continuing on through a series of trimming, punching and bending steps. This working, and especially the stamping, pressing or drawing, places the previously applied coating system under severe conditions for maintaining coating adhesion to the substrate.

In such operation the coating is subjected to a slip, or shear, adhesion condition. As the metal is pressed, as into a die, it flows, sometimes sliding and stretching, thereby subjecting the coating to shear. It would be highly desirable to enhance coating adhesion under such conditions while maintaining other desirable coating characteristics, e.g., impact adhesion and corrosion protection.

SUMMARY OF THE INVENTION

It has now been found that shear adhesion of coating composites applied to metal surfaces can be desirably enhanced when both the pre-paint and the topcoating compositions are formulated with careful control over not only distribution of particle size for the particulate substances, but also control in selection of the associative particle size, comparing such size for the undercoating particles with that of the topcoating particles. Applied composite coatings will also exhibit the other desirable characteristics that are sought in such coating systems, e.g., corrosion protection and impact adhesion.

In one aspect, the present invention is directed to a coated metal substrate having on the surface thereof an adherent, corrosion resistant composite coating.

This coating first comprises a water-insoluble, corrosion resistant pre-paint undercoating from a coating composition comprising liquid medium and at least one compound, supplying in non-elemental form, an element selected from the group consisting of phosphorous, chromium and mixtures thereof; further, the coating has distributed therethrough, and in substantial uniformity therein, a first particulate substance selected from the group consisting of a microcrystalline coating structure, pulverulent component maintaining particulate integrity in the undercoating, and mixtures thereof, with the preponderance of such first particulate substance having substantially controlled size uniformity.

On this undercoating there is a topcoating containing distributed therethrough, in at least substantial uniformity, a second particulate substance. This substance is a pulverulent component maintaining particulate integrity in the topcoating, and the preponderance of this second particulate substance has substantially controlled size uniformity. It is further critical in this coating composite that the ratio for the average size of the second particulate substance to the average size of the first particulate substance be above 1:1.

The present invention is also directed to the method of preparing composite coated metal substrates, as well as to subsequently painted substrates and the articles that can be thereby obtained.

DESCRIPTION OF THE PREFERRED EMBODIMENTS

The known pre-paint metal treating compositions need not be complex. They may be simply solutions of $CrO_3$ in water, advantageousy with a wetting agent, as discussed in U.S. Pat. No. 3,351,504. Such a solution, as prepared by chromic acid and water, can be entirely supplied by chromic acid or can also contain a salt of chromium, as has been discussed in U.S. Patent Application, Ser. No. 96,968. Such uncomplex metal treating compositions need not be simply aqueous based. For example, U.S. Pat. No. 2,927,046 teaches a pre-paint bonding composition of chromic acid dissolved in tertiary butyl alcohol.

Some of the pre-paint coating compositions for preparing the undercoating may be conveniently referred to as "conversion coatings." Such may be prepared typically from phosphoric acid or chromic acid; and, some of the development of such coatings can be traced by reference to patents that are listed in U.S. Pat. No. 3,063,877. Such coatings, which may be of the phosphate or the chromate type, for purposes of the present invention, when not containing particulate substance, should form highly adherent and water soluble microcrystalline coatings on the substrate metal surface. Such microcrystalline coating structure may then provide, alone or in conjunction with pulverulent components, the undercoating particulate substance. As has been shown in U.S. Pat. No. 2,901,385, it is also possible to obtain highly adherent microcrystalline coatings, which are bonding coatings, that are obtained from undercoating compositions that contain chromium, for example from dichromate salts, as well as phosphorous. This can be supplied simply by phosphoric acid and such compositions may further include a hypophosphite divalent metal salt that, during coating formation, will serve to reduce the hexavalent chromium composition and thereby form the bonded coating.

The microcrystalline coatings may also be obtained from bonding coatings that simply contain chromic acid and a reducing agent therefor, as taught in U.S. Pat. No. 3,382,081. Such compositions when cured on a metal substrate at elevated temperature, form an insoluble, polymeric microcrystalline substrate. It is important when such microcrystallinity is used apart from a pulverulent component to supply the first particulate substance that the coating composition form an adherent microcrystalline substrate as opposed to an amorphous structure. Otherwise, such undercoating should contain pulverulent component. In this regard it is taught in U.S. Pat. No. 3,462,319 that an aqueous coating system containing a mixture of, typically, chromic acid and phosphoric acid, may further include finely divided inorganic material such as titanium dioxide, colloidal silica, or aluminum metal powder or zinc metal powder. It has also been shown as in U.S. Pat. No. 3,067,045, that useful aqueous coating solutions, having essentially alkaline pH and containing alkali metal phosphate plus a metal oxide bath regulating agent, can further include particulate substance, e.g., finely divided zinc metal. Even in the very simple undercoating compositions it is possible to form a suitable undercoat containing particulate substance, such as has been taught in U.S. Pat. No. 3,687,738. Representative of compositions disclosed in this patent are treating solutions containing simply chromic acid and a particulate metal such as aluminum, manganese, zinc and magnesium. Further, these particulate metals have been disclosed as useful in bonding coating compositions, containing a hexavalent-chromium-providing substance and reducing agent therefor, in U.S. Pat. No. 3,671,331.

Of particular interest in the present invention are the bonding coatings, i.e., coating from compositions containing hexavalent-chromium-providing substance and a reducing agent therefor. Those that are preferred may contain succinic acid and other dicarboxylic acids of up to 14 carbon atoms as the reducing agents, as has been disclosed in U.S. Pat. No. 3,382,081. Such acids with the exception of succinic may be used alone, or these acids can be used in mixture, or in mixture with other organic substances exemplified by aspartic acid, acrylamide or succinimide. Additionally useful combinations that are particularly contemplated are combinations of mono-, tri- or polycarboxylic acids in combination with additional organic substances as has been taught in U.S. Pat. No. 3,519,501. Also of particular interest are the teachings in regard to reducing agents, that may be acidic in nature, and have been disclosed in U.S. Pats. Nos. 3,535,166 and 3,535,167.

Substantially all of the pre-paint undercoating compositions are simply water based, ostensibly for economy. But for additional or alternative substances, to supply the liquid medium at least for some of these compositions, there have been taught, as in U.S. Pat. No. 3,437,531, blends of chlorinated hydrocarbons and a tertiary alcohol including tertiary butyl alcohol as well as alcohols other than tertiary butyl alcohol. It would appear then in the selection of the liquid medium that economy is of major importance and thus such medium would most always contain readily commercially available liquids.

The pulverulent component for the undercoating, and that will maintain particulate integrity in the undercoating, in addition to the above mentioned finely divided metals and titanium dioxide, or colloidal silica, include pulverulent inorganic substance such as aluminum oxide, silicon dioxide, ferric oxide, nickel oxide, manganese dioxide, chromic oxide, chromic fluoride, zinc oxide, calcium silicate, aluminum silicate, magnesium silicate, silicon carbide, ferric phosphate, calcium sulfite, barium sulfite, calcium sulfate, barium sulfate, carbon black, clay, including for example, kaolinite and montmorillonite, sand, talc, mica, Wollastonite, Fuller's earth, diatomaceous earth, and mixtures thereof.

The undercoated metal surface then has applied thereto a topcoat. Although the nature of the topcoat is very broad in contemplation, topcoatings of especial interest can contain finely divided pulverulent material. For example, it has been shown in U.S. Pat. No. 3,671,331 that a primer containing a particulate, electrically conductive pigment provides a highly serviceable topcoating for a metal substrate that is first treated with a bonding coating composition containing a pulverulent metal. U.S. Pat. No. 3,687,739 shows the special advantages obtained by applying a topcoating, also containaing a particulate electrically conductive pigment, over an undercoating wherein key ingredients are chromic acid and a pulverulent metal. Such topcoatings, which are representative of those that contain pulverulent metal, are often for convenience referred to as "weldable primers." These primers contain an electrically conductive pigment plus a binder in a vehicle. Thus, it has been disclosed in U.S. Pat. No. 3,110,691 that a suitable zinc base paint composition for application to a metallic surface prior to welding can be prepared where key ingredients include not only the particulate zinc but also a liquid vehicle including a resinous film forming binder such as epoxy resin. Likewise, U.S. Pat. No. 3,118,048 shows a coating composition, that may be applied prior to welding, and has as chief ingredients a solvent forming at least a portion of the liquid vehicle and further containing a synthetic resin film-forming, or binder, component, of which modified alkyd resins are exemplary. In general, the particulate electrically conductive pigments in the weldable primers are aluminum, copper, cadmium, steel, carbon, zinc or magnetite, i.e., the magnetic oxide of iron, and these primers of particular interest include such pigments as particles that include particles of larger size than the particulate zinc in the pre-paint coating. Also, the binder components may include polystyrene, chlorinated or isomerized rubber, polyvinyl acetate and polyvinyl chloride-polyvinyl acetate copolymers, alkyd/melamine, and epoxy esters.

A topcoating formulation applicable to metal substrates, without weldability in mind, contains particulate zinc along with zinc oxide. Such paints are often formulated with a zinc dust to zinc oxide ratio of about 4:1, although such ratio may be as high as 9:1. Total pigment concentrations will vary considerably and are typically dependent upon the ratio of the zinc to the zinc oxide. Also, the ingredients in the topcoating formulation will typically be dependent upon the zinc to zinc oxide ratio. For example, where such ratio is 4:1 the vehicle usually employed is linseed oil or other oleoresinous medium. At ratios greater than 4 to 1, and with pigment concentrations ranging up to 90 to 95 percent, such compositions typically include polystyrene plasticized with chlorinated diphenyls.

Another topcoating system of special consideration has been referred to in the prior art, most ostensibly for convenience, as "silicate coatings." These appear to be aqueous systems that contain a finely divided metal such as powdered zinc or aluminum, lead, titanium or iron plus a water soluble or water dispersible binder. Representative of the binders are alkali metal silicates, an organic silicate ester, or a colloidal silica sol. Thus, U.S. Pat. No. 3,372,038 shows an aqueous coating system for providing corrosion resistance to metal substrates with a formulation containing a finely divided zinc powder plus an organic ammonium silicate. Although such silicate coatings are not typically employed before welding, U.S. Pat. No. 3,469,071 discloses arc-welding of a steel having a protective coating that may be derived from a coating composition containing inert silicate fillers, zinc powder and partically hydrolized esters of amphoteric metal binders, for example ethyl silicate. In U.S. Pat. No. 2,944,919 an aqueous based coating composition that contains a sodium silicate may further contain a finely divided metal in addition to zinc, such as magnesium, aluminum, manganese and titanium.

In addition to the above mentioned pulverulent metals, the pulverulent material providing the second particulate substance can be one or more of the hereinabove discussed materials supplying the first particulate substance. It is critical for enhancing the shear adhesion of the resulting composite coating system that the ratio of the average size of second particulate substance to the average size of the first particulate substance be above 1:1. As used herein, the average particle size is one wherein the weight percent of the particles having larger size is equal to the weight percent having size finer than the average. It is advantageous for adhesion under shear condition that such ratio be above about 1.1:1 up to about 5:1, but is preferably between about 1.2:1 and 3:1. To further augment the adherence of the composite coating system under shear conditions, it is advantageous if a preponderance of the particles, and preferable that all of the particles in both particulate substances, have size for all particles of below 50 microns. Further, such particles should be in powdered, particulate condition as opposed to finely divided flaked particulates.

With these very finely divided particulate substances of size below 50 microns, it has been found that adhesion will be enhanced when substantial control is exercised over the size uniformity of the particulate substances. In this regard, it is advantageous that above about 75 percent of the particles, in both the first particulate substance of the undercoating and the second particulate substance of the topcoating have size within a range of less than about 10 microns. For the very finely divided substances, such control may be achieved during particle classification, when actual production or manufacturing of the particles will not produce the finely divided material having particles within such size range. For example, it is possible in classification to obtain a pulverulent metal such as a particulate zinc, as a very finely divided particulate substance having an average particle size of only about 3 or 4 microns. However, in the classification achieving such finely divided zinc, it is further possible to provide that about 80 weight percent of the particles will have size within a range of about 8–10 microns.

In general, there is sufficient particulate substance in the undercoating to supply from about 50 to about 5,000 milligrams per square foot of coated substrate of such pulverulent component. Where the topcoating is an additional coating of the undercoating, but with care being exercised in regard to particle size of the particulate substance of the topcoat so as to provide the necessary particle size ratio, such topcoating may also have from about 50 to about 5,000 milligrams per square foot of coated substrate of the pulverulent component. However, it is not unusual for the topcoating to greatly exceed 5,000 milligrams per square foot of coated substrate for such coating and to be more typically measured in coating thickness, e.g., from about 0.5 mil up to several mils, such as 6 mils or even a greater coating thickness.

Although in the considerations for a topcoating over the undercoated metal surface, such above discussed topcoatings are of special interest, the undercoated and topcoated metal substrate can be further topcoated typically with any suitable paint, i.e., paint, primer, enamel, varnish or lacquer. Such paints may contain pigment in a binder or can be unpigmented as exemplified by cellulose lacquers, rosin varnishes, and oleoresinous varnishes. The paints can be solvent reduced or may be water reduced, e.g., latex or water soluble resins, including modified or soluble alkyds, or the paints can have reactive solvents such as in the polyesters or polyurethanes.

Although in the considerations for a topcoating over a weldable metal substrate, additional composite coating systems may be contemplated. For example, after the pre-paint coating composition of the present invention is applied to a weldable metal substrate, such substrate may be topcoated with a weldable primer and then, following welding, the resulting metal assembly is further topcoated. The weldable primers, and often the silicate primers, are formulated with subsequent topcoating of such primers being taken into consideration during formulation. Since at least the weldable primers typically contain an electrically conductive pigment, the topcoating may be an electrocoated primer.

The electrodeposition of film-forming materials is well known and can include electrocoating of simply a film-forming material in a bath where such a bath may contain one or more pigments, metallic particles, drying oils, dyes, extenders and the like. Representative film-forming systems of this nature are set forth, for example, in U.S. Pats. Nos. 3,304,250 and 3,455,805. Also, substances of particular interest, for example in the automotive industry, are the anodically deposited film-forming materials as exemplified by U.S. Pat. No. 3,230,162. Included in these composite coating systems there can be an electrophoretically deposited zinc paint. Such may be deposited, for example, on the pre-paint treated metal surface of the present invention and the deposited zinc paint provides intermediate coating for subsequent top-coating. In U.S. Pat. No. 3,464,906 a zinc paint that can be electro-deposited and contains water-soluble or dispersible resin as a binder in aqueous medium, is taught.

Reference has been made hereinbefore to welding and specifically to arc-welding. So long as the metal substrate is weldable, the pre-paint coating composition can be adapted to provide continued weldability in addition to corrosion resistance for the metal substrate. Thus a pre-paint coating composition of the present invention but formulated under considerations presented in U.S. Pat. No. 3,687,738 will provide for retention of weldability of the substrate. Furthermore, when reference is made herein to welding, the subsequent welding under consideration maybe electrical resistance welding and such may be spot welding, i.e., localized electrical resistance welding, or seam welding such as with roller electrodes.

Before application of the pre-paint coating composition to a metal substrate it is generally advisable to remove foreign matter from the metal surface by thoroughly cleaning and degreasing. Degreasing can be accomplished with known agents such as sodium metasilicate, caustic soda, carbon tetrachloride, trichlorethylene and the like. The use of commercial alkaline cleaning compositions may be employed which combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

PREPARATION OF TEST PANELS

Steel test panels, typically 4 × 8 inches, and all being cold rolled, low carbon steel panels are prepared for coating by first scrubbing with a cleaning pad which is a porous, fibrous pad of synthetic fiber impregnated with an abrasive. Thereafer, the scrubbed panels are immersed in a cleaning solution typically containing chlorinated hydrocarbon and maintained at about 180° F., or containing 5 ounces, per gallon of water, of a mixture of 25 weight percent tripotassium phosphate and 75 weight percent potassium hydroxide. This alkaline bath is maintained at a temperature of about 150°–180° F. Following the cleaning, the panels are rinsed with warm water and preferably dried.

PRE-PAINT COATING COMPOSITION and APPLICATION

A pre-paint composition is applied to clean test panels prior to primer application. This compsition is prepared by mixing into 962 milliliters (ml.) of water, 20 grams of chromic acid, 3.33 grams of succinic acid, 1.67 grams of succinimide, 1.5 grams of heteropolysaccharide dispersing agent, 1 ml. of formalin, and one drop of a wetter which is a nonionic, modified polyethoxide adduct having a viscosity in centipoises at 25° C. of 180 and a density at 25° C. of 8.7 lbs. per gallon. This composition can further contain, as will be noted in the example, 150 grams of an "L-15" zinc dust manufactured by American Smelting and Refining Co. The zinc dust has an average particle size of about 5.1 microns, a maximum particle size of about 26 microns with about 11 percent of the particles having size greater than 10 microns; further, this zinc dust has about 5 weight percent of the particles finer than 2 microns.

Panels are dip coated into this pre-paint composition, removed and excess composition is drained from the panels, and they are then baked for 4.5 minutes in an oven at a temperature of 550° F. The panels have a coating weight of particulate zinc of 520 milligrams per square foot.

PRIMER COATING and APPLICATION

The primer used in the example, initially is a commerically available primer which is a zinc-rich weldable primer having at first a weight per gallon of 15.4 lbs., an initial solids volume of 30 percent, and containing initially 64 weight percent of nonvolatiles. The binder component is prepared from a high molecular weight epoxy resin. Prior to use, this primer is reduced to a viscosity of 45 seconds as measured on a No. 4 Ford cup with an aromatic solvent prepared synthetically from petroleum and having a flash point of 145°–150° F. It contains additional pulverulent zinc as detailed in the example. This primer is applied to all of the pre-painted panels by drawing the primer down over the panel with a draw bar to provide a smooth, uniform primer coat on each of the pre-painted panels. Resulting coated panels are cured for 4 minutes in an oven at 550° F.

DRAW TEST (SHEAR ADHESION)

The adhesion of the coating system on the panel under shearing force is measured in the draw test. In this test the panel is first oiled on both sides of the panel with a light oil. The panel is then drawn through the draw test; next it is pressed to return the panel to its original shape, and finally the panel, without further oiling, is subjected again to the draw test. After removal from the second draw, the panel is wiped clean and is then visually inspected to determine the percentage of the exposed bare metal, or alternatively, of the coating system retained on the panel.

In this inspection, panels are compared one with the other, and the percent retention is generally estimated simply after visual inspection, although, the panels may be subsequently soaked for 10 seconds in copper sulphate solution, containing 160 grams of copper sulphate per liter of water. This facilitates the visual determination of what percentage of the panel is left uncovered owing to the copper from the copper sulphate plating on the base steel, but not on burnished zinc. That is, the copper sulphate will not plate on the coating where the zinc has been polished by scraping but not removed to bare steel. The passage of the panel twice through the draw test is found from experience to better correlate results for coating adhesion under shear force with such results as would be observed in industry. For example, in the automotive industry as has been mentioned hereinbefore, primer coated panels often proceed through as many as five or more operations, including drawing, pressing, trimming, punching and bending.

In the draw test, more specifically, there is used a Tinius Olsen Ductomatic Sheet Metal Tester, Model BP-612-N. This machine is commonly used in the steel industry for determining the ductility of steel panels. In general, an about 1.75"× 12" steel panel is held firmly between male and female dies, such having a central aperture, to permit a metal ram to move upwardly through the dies for a pre-selected distance. The ram forces the panel upwardly in the aperture of the male die, resulting in the pulling and stretching of part of the panel through a portion of the mating surface of the dies. More particularly, the female die, measuring approximately 3.5 × 6 × 0.75 inches is placed so that its central aperture of about 2 × 1 inches, is located directly over the ram.

The panel for testing is then placed flat across the female die so that a portion of the panel projects out from one die edge. The male die, of essentially similar dimensions to the female die, is then placed on top of the test panel; its central aperture is positioned over the metal ram. The female die on its upper surface contains two projecting ridges across the width of the die, one on each side of the aperture and having an inverse U-shape. The lower face of the male die is machined to have two U-shaped grooves, each about 0.25 inch deep, one on each side of the aperture, and across the width of the undersurface. The ridges provide a snug fit into the corresponding grooves, thereby enhancing the firm grip for the dies on the test panel. Also, one groove/ridge configuration provides two bearing, i.e., scraping, surfaces during the test, as discussed further hereinbelow.

At each corner, the female die has a pin extending upwardly for mating with a corresponding aperture in the male die. These pins are for maintaining stability of the dies during the test and are not in contact with the test panel. After the male die is in place, a hinged breach is pulled down on top of the male die and locked. The portion of the test panel projecting out from the dies is clamped. By such action, the clamping of approximately one-half of the panel is more firmly established; thus, during testing only about the other half of the panel will be free to move and be drawn during the test. After clamping, the instrument clamp load is set at 3,000 lbs., the rate of draw dial provided on the instrument is set at 10, and the ram is permitted to move upwardly for a distance of about 2.5 inches. During this movement, about the first half-inch of ram movement is necessitated to move the rounded-dome ram into contact with the panel and the remaining about 2 inches of movement actually draws half of the panel through the mated die surfaces.

In typical operation for an 0.036-inch steel, the ram is moved upwardly at a force of about 2,500–4,000 lbs. The half-portion of the panel tested is drawn across three bearing surfaces. Two of these are provided by the edges of the groove in the groove/ridge configurations. The third bearing surface is the edge of the male aperture parallel and closest to the groove providing the other two bearing surfaces. The panel portion thus actually subjected to the test typically measures about 1-¾ × 2.5 inches. With the above mentioned 0.036-inch steel, this section will often exhibit an about 20–25 percent total metal extension, beyond its original test length, after the second draw. After such draw, the general configuration of the panel shows a U-shaped central portion that has been pushed upwardly about 2 inches from the original flat surface.

CORROSION RESISTANCE TEST

Panels are subjected to the corrosion resistance test by means of the standard salt spray (fog) test for paint and varnishes as described in ASTM B-117-64. In this test, panels are placed in a chamber held at constant temperature where they are exposed to a fine spray (fog) of a 5 percent salt solution for a period of time as noted in the examples. Upon removal from the chamber the panels are rinsed in water and then dried. The extent of corrosion, i.e., red rust, on the test panels is determined by visual inspection through comparison of panels one with the other.

EXAMPLE

Before use, the above described primer is divided into portions and one portion, identified hereinafter as Primer K and formulated for comparative purposes is further blended with 10 weight percent, basis total weight of the primer, of additional pulverulent zinc. This additional pulverulent zinc is the above-identified commercial pulverulent zinc. Another portion of the primer is blended with an additional 10% by weight of a subsequent pulverulent zinc to formulate a Primer I composition. This subsequent pulverulent zinc is used to form a primer representative of the present invention, and has an average particle size of 7.1 microns, with 19 percent of the particles having size greater than 10 microns; this particulate zinc further has a maximum particle size of 26 microns and, although 7 percent of the particles are finer than 4 microns, only about 0.5 percent are finer than 3 microns. This zinc is obtained as the coarse fraction from classification of the above-described L-15 zinc powder.

This coarse fraction is obtained by classification in a Donaldson particle classifier manufactured by the Donaldson Company, Inc., Corad Division. In essence, the commercially available L-15 zinc dust is automatically fed into a rotating chamber while three variables, i.e., airflow, rotor speed and vortex freedom, are adjusted. In this way, the classifier, which is more specifically described in U.S. Pat. No. 3,491,879, controls the drag and centrifugal force on the inflow of particles. By this operation, the coarse fraction used in the primer is obtained from the periphery of the rotor apparatus while the zinc particle fines are removed at the vortex of such apparatus.

These fine zinc particles have an average particle size of 3.2 microns, with one weight percent having size greater than 10 microns; this particulate zinc further has 17 weight percent of the particles finer than 2 microns. In the manner described hereinbefore, this classified zinc is used to prepare a pre-paint composition also as described above, which resulting composition is the same except for containing 150 grams per liter of this classified zinc dust. From this composition, pre-painted panels are then prepared also as above described.

As shown in the table below, the Primer K and the Primer I are used to coat panels that have undercoatings as are described herein. For convenience, the table lists the average particle size of the pulverulent zinc in the undercoating, as well as for such zinc added to the primer, for each of the prepared panels. The prepared panels after testing in the above detailed draw test are then subjected to the hereinabove described corrosion resistance test. In the table below the results of this corrosion resistance test are noted as results from salt spray testing and as a percentage of the panel face showing red rsut after testing for 88 hours. The adhesion results of the draw test are also listed in the table below and are an average of two panels subjected to the test.

TABLE

| Particulate Zinc: Particle Size Average* | | Ratio of Average Topcoat/Pre-Paint | Salt Spray % Corrosion 88 hours | Draw Test % Coating Retained** |
|---|---|---|---|---|
| Pre-Paint | Topcoat | | | |
| 5.1 | 5.1 | 1:1 | 36 | 93 |
| 5.1 | 7.1 | 1.39:1 | 14 | 98 |
| 3.2 | 5.1 | 1.59:1 | 12 | 100 |

*In microns
**Average of two panels.

The difference in the percent corrosion in salt sray testing is significant between the first reported, or control, coating system, and the next two composite coatings listed. The difference between the panels on the draw adhesion test may not be as readily understood. To be fully appreciated it must be kept in mind that the 5–7 percent increase in coating retention is achieved at a level of coating retention that is above the 90 percent retention level, where even a lesser increase can be extremely difficult, if not impossible, to achieve. Now, however, with the exercise of control over the average particle size ratio, as representative of the present invention, such increase is readily and consistently obtained.

We claim:

1. A coated metal substrate having on the surface thereof an adherent, corrosion resistant coating comprising;
    A. a water-insoluble, corrosion resistant pre-paint undercoating from a coating composition comprising liquid medium and at least one compound, supplying in non-elemental form, an element selected from the group consisting of phosphorous, chromium and mixtures thereof, said coating having distributed therethrough, and in substantial uniformity therein, a first particulate substance selected from the group consisting of a microcrystalline coating structure, pulverulent component maintaining particulate integrity in said undercoating, and mixtures thereof, with the preponderance of said first particulate substance having substantially controlled size uniformity;
    B. a topcoating containing distributed therethrough, in at least substantial uniformity, a second particulate substance that is a pulverulent component maintaining particulate integrity in said topcoating, the preponderance of said second particulate substance having substantially controlled size uniformity; and
    C. with the ratio of the average size of said second particulate substance to the average size of said first particulate substance being above 1:1.

2. The coated metal substrate of claim 1 wherein the coating composition supplying said undercoating is an aqueous conversion coating.

3. The coated metal substrate of claim 2 wherein said aqueous conversion coating is a phosphate conversion coating.

4. The coated metal substrate of claim 2 wherein said aqueous conversion coating is a chromate conversion coating.

5. The coated metal substrate of claim 1 wherein said coating composition for said undercoating is a bonding coating composition containing hexavalent-chromium-providing substance and reducing agent therefore.

6. The coating composition of claim 5 wherein said reducing agent is supplied by carboxylic acid plus additional organic substance.

7. The coating composition of claim 6 wherein said acid is dicarboxylic acid and said additional organic substance is selected from the group consisting of succinimide, acrylamide and aspartic acid.

8. The coated metal substrate of claim 1 wherein said undercoating is from a coating composition containing chromic acid, phosphoric acid, or mixtures thereof and said first particulate substance is a microcrystalline structure obtained by heating the metallic substrate coated with said composition at elevated temperature.

9. The coated metal substrate of claim 1 wherein said first particulate substance is pulverulent metal and said second particulate substance is pulverulent metal, and each of said metals is selected from the group consisting of zinc, manganese, aluminum, magnesium, and mixtures thereof.

10. The coated metal substrate of claim 1 wherein said first particulate substance and said second particulate substance are each refractory inorganic substance selected from the group consisting of aluminum oxide, silicon dioxide, ferric oxide, nickel oxide, manganese dioxide, chromic oxide, chromic fluoride, titanium dioxide, zinc oxide, calcium silicate, aluminum silicate, magnesium silicate, silicon carbide, ferric phosphate, calcium sulfite, barium sulfite, calcium sulfate, barium sulfate, carbon black, sand, talc, mica, Wollastonite, Fuller's earth, diatomaceous earth, and mixtures thereof.

11. The coated metal substrate of claim 1 wherein the preponderance of particles in said first particulate substance, and the preponderance of particles in said second particulate substance, have size below about 50 microns, and the ratio for the average size of said second particulate substance to the average size of said first particulate substance is between about 1.1:1 and 5:1.

12. The coated metal substrate of claim 11 further characterized by all of said first particulate substance and all of said second particulate substance having particle size below 50 microns, with the controlled size uniformity for said first particulate substance, and the controlled size uniformity for said second particulate substance, providing each of said substances with size such that above about 75 percent of substance particles have size within a range less than about 10 microns.

13. The coated metal substrate of claim 12 wherein the ratio of the average size of said second particulate substance to the average size of said first particulate substance is between about 1.2:1 and 3:1.

14. The method of preparing a coated metal substrate having on the surface thereof a composite corrosion resistant coating having enhanced adhesion under shear condition, which method comprises:
   A. establishing on the surface of said metallic substrate a water insoluble pre-paint undercoating from a coating composition comprising liquid medium and at least one compound, supplying in nonelemental form, an element selected from the group consisting of phosphorous, chromium and mixtures thereof, said coating having distributed therethrough, and in substantial uniformity therein, a first particulate substance selected from the group consisting of microcrystalline coating structure, pulverulent component maintaining particulate integrity in said undercoating, and mixtures thereof, with the preponderance of said first particulate substance having substantially controlled size uniformity;
   B. applying on said undercoating a topcoating containing distributed therethrough, in at least substantial uniformity, a second particulate substance that is a pulverulent component maintaining particulate integrity in said topcoating, the preponderance of said second particulate substance having substantially controlled size uniformity; while,
   C. controlling the ratio of the average size of said second particulate substance to the average size of said first particulate substance to above 1:1.

15. The method of claim 14 wherein the preponderance of particles in said first particulate substance, and the preponderance of particles in said second particulate substance, have size below about 50 microns, and said ratio for the average size of said second particulate substance to the average size of said first particulate substance is between about 1.1:1 and 5:1.

16. The method of claim 15 further characterized by all of said first particulate substance and all of said second particulate substance having particle size below 50 microns, with the controlled size uniformity for said first particulate substance, and the controlled size uniformity for said second particulate substance, providing each of said substances with size such that above about 75 percent of substance particles have size within a range less than about 10 microns.

17. The method of claim 14 wherein the ratio of the average size of said second particulate substance to the average size of said first particulate substance is between about 1.2:1 and 3:1.

18. The method of claim 14 wherein said first particulate substance is a pulverulent component maintaining particulate integrity in said undercoating and said pulverulent component is applied to the surface of said metallic substrate separate from the application to said substrate of the undercoating composition liquid medium.

19. The method of claim 14 wherein said first particulate substance is a pulverulent component supplying said undercoating with from about 50 to about 5,000 milligrams per square foot of coated substrate of pulverulent component.

20. The method of claim 14 wherein the volatile coating substituents from said undercoating are at least in part volatilized during heating of said undercoating composition at elevated temperature prior to application of said topcoating.

21. The method of claim 14 further characterized by applying to said topcoating a subsequent paint topcoating.

22. An undercoated, topcoated, and subsequently paint topcoated metal article prepared according to the method of claim 21.

* * * * *